(12) United States Patent
Engelbert et al.

(10) Patent No.: US 9,576,486 B2
(45) Date of Patent: Feb. 21, 2017

(54) VIRTUAL PARKING MANAGEMENT

(75) Inventors: Tobias Engelbert, Würselen (DE); Gordian Jodlauk, Würselen (DE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 14/427,264

(22) PCT Filed: Sep. 11, 2012

(86) PCT No.: PCT/EP2012/067710
§ 371 (c)(1),
(2), (4) Date: Mar. 10, 2015

(87) PCT Pub. No.: WO2014/040612
PCT Pub. Date: Mar. 20, 2014

(65) Prior Publication Data
US 2015/0221219 A1    Aug. 6, 2015

(51) Int. Cl.
| *B60Q 1/48* | (2006.01) |
| *G08G 1/065* | (2006.01) |
| *G07B 15/02* | (2011.01) |
| *G01S 19/13* | (2010.01) |

(52) U.S. Cl.
CPC ............... *G08G 1/065* (2013.01); *G01S 19/13* (2013.01); *G07B 15/02* (2013.01)

(58) Field of Classification Search
CPC .................. G07B 15/02; G07B 15/063; G08G 1/14–1/144; G08G 1/145; G08G 1/148; G08G 1/065; G06Q 30/0283; G01S 19/13

USPC .................... 340/932.2, 5.2, 5.8; 705/13
See application file for complete search history.

(56) References Cited

U.S. PATENT DOCUMENTS

| 7,783,530 B2 | 8/2010 | Slemmer et al. |
| 2006/0142933 A1 | 6/2006 | Feng |
| 2012/0203600 A1* | 8/2012 | Fiorucci ............ G06Q 30/0226 705/13 |
| 2012/0215594 A1 | 8/2012 | Gravelle |

FOREIGN PATENT DOCUMENTS

WO    WO 2011/071548 A1    1/2010

OTHER PUBLICATIONS

International Search Report and Written Opinion of the International Searching Authority, PCT Application No. PCT/EP2012/067710, May 23, 2013.

* cited by examiner

*Primary Examiner* — Thomas Mullen
(74) *Attorney, Agent, or Firm* — Myers Bigel, P.A.

(57) ABSTRACT

An apparatus manages vehicle parking services in a flexible and cost efficient manner. Service information for vehicle parking in a spatial and time varying parking area is received at a vehicle from a parking service management apparatus. A geographical position of the vehicle relative to the parking area is determined and forwarded to the parking service management apparatus. These communications can trigger issuance of a vehicle parking ticket at the parking service management apparatus based on the geographical position of the vehicle.

19 Claims, 10 Drawing Sheets

VIRTUAL PARKING MANAGEMENT

CROSS REFERENCE TO RELATED APPLICATION

This application is a 35 U.S.C. §371 national stage application of PCT International Application No. PCT/EP2012/067710, filed on 11 Sep. 2012, the disclosure and content of which is incorporated by reference herein in its entirety. The above-referenced PCT International Application was published in the English language as International Publication No. WO 2014/040612 A1 on 20 Mar. 2014.

TECHNICAL FIELD

The present invention relates to a virtual parking management for vehicles which are located in a pre-determined parking area.

BACKGROUND

Data communication in mobile communication networks is dominated by use of a request response communication mechanism that is triggered by a mobile terminal or by P2P communication using Short Message Service SMS or Multimedia Messaging Service MMS. Recently enriched request response communication is used which relies on Location Based Service LBS technologies or broadcast technologies.

Location Based Service LBS technologies enable content delivery based on the location or geographical position of a user. The location information of the user may be provided by a network operator through use of a Mobile Positioning System MPS or through use of Global Positioning System GPS based mechanisms. The Mobile Positioning System MPS is based on cell ID information or timing advances/triangulation algorithms that provide an accuracy of several hundred meters depending on a diameter of a cell. Global Positioning System GPS based localization mechanisms are more precise but necessitate an additional GPS receiver and thus additional hardware at the mobile terminal using Location Based Service LBS technologies.

Further, location based systems are used for an indication of a geographical position of a mobile terminal being located in a spatial area. A cellular communication system can be used to send geographical positions to a backend where specific location based services are coordinated. E.g., the user of a location based service may be the driver of a car who uses a geographic position to receive a parking ticket valid for his current location and for a validity period.

However, existing solutions location based delivery of parking tickets impose an inconvenience for service users and come with a high price tag for deployment and maintenance. Also, existing solutions lack flexibility in time and location based pricing.

Further, nowadays individual parking meters are rarely found as they require high investments and lead to high maintenance costs. They do not allow for cashless payment and potentially disputes about defective parking meters may occur.

Further, centralized parking meters serve a larger area but require additional signing with directions to the drivers such that the users find the correct parking meter. These parking meters are complex, require high investments and costly maintenance, and do not support cashless payment. Users have to leave their car to go to the parking meters, have to insert coins, and have to bring the purchased parking ticket back to the car for display. Also users have to pay in advance for parking services either paying for a period being longer than needed to have to take the risk to park longer than an allowable parking duration and receive a fine.

Further with gate-based parking users draw a ticket when they arrive at a gate and pay the fee at a centralized parking meter before they leave. When they pay their ticket it is cleared for exit within a certain grace period. When users lose a ticket they might have to pay the fee for a full day. Finally, gate-based parking usually requires at least one person.

Still further, while existing SMS parking solutions are more convenient than those discussed above the user still has to look at a sign with a certain area code which is displayed and shown at a parking place. Then, he has to send the certain area code on the sign together with a license plate number as an SMS message to a specific mobile number which might lead to disputes in case of mistyped information.

SUMMARY

The object of the present invention is to provide an implementation of parking service delivery which may be implemented in a flexible and cost efficient manner.

According to a first aspect of the present invention there is provided a virtual parking meter apparatus. The virtual parking meter apparatus comprises a communication unit, a positioning unit, and a ticketing unit. The communication unit is adapted to receive service information for vehicle parking in a pre-determined parking area from a parking service management apparatus. The positioning unit is adapted to determine a geographical position of a vehicle in the pre-determined parking area. Further, the ticketing unit is adapted to trigger issuance of a vehicle parking ticket at the parking service management apparatus in accordance with the geographical position and the received service information.

According to a second aspect of the present invention there is provided a virtual on-site parking meter apparatus. The virtual on-site parking meter apparatus comprises a communication unit, a ticketing unit, and a printing unit.

The communication unit is adapted to receive service information for vehicle parking in a pre-determined parking area from a parking service management apparatus and to receive a geographical position of a vehicle in the pre-determined geographical area. The ticketing unit is adapted to trigger issuance of a vehicle parking ticket at the parking service management apparatus in accordance with the geographical position and the received service information. Further, the printing unit is adapted to print the vehicle parking ticket for subsequent display at the vehicle.

According to a third aspect of the present invention there is provided a mobile parking policy enforcement apparatus that comprises a capturing unit and a verification unit. The capturing unit is adapted to capture a geographical position of a vehicle in a pre-determined parking area and vehicle parking ticket information from the vehicle. Further, the verification unit adapted to forward the geographical position and the vehicle parking ticket information to a parking service management apparatus for subsequent verification thereof.

According to a fourth aspect of the present invention there is provided a parking service management apparatus. The parking management server comprises a parking information unit, a communication unit, and a ticketing unit. The parking information unit is adapted to store and manage pre-determined parking areas and service information for vehicle parking. The communication is adapted to disseminate the service information for vehicle parking to a pre-determined parking area and to receive a ticket request from a vehicle or an on-site parking meter apparatus, wherein the ticket request at least indicates a geographical position of a vehicle requesting the ticket. The ticketing unit is adapted to issue of a vehicle parking ticket in accordance with the geographical position and service information for vehicle parking.

According to a fifth aspect of the present invention there is provided a method of operating a virtual parking meter apparatus. Initially, at a vehicle there is received service information for vehicle parking in a pre-determined parking area from a parking service management apparatus. Then, there is determined a geographical position of a vehicle in the pre-determined parking area. Finally, there is requested the issuance of a vehicle parking ticket at the parking service management apparatus in accordance with the geographical position and the received service information.

According to a sixth aspect of the present invention there is provided a method of operating a virtual on-site parking meter apparatus. Initially, there is received service information for vehicle parking in a pre-determined parking area from a parking service management apparatus. Further, there is received a geographical position of a vehicle in the pre-determined geographical area followed by issuance of a vehicle parking ticket at the parking service management apparatus in accordance with the geographical position and the received service information. Finally, the vehicle parking ticket is printed for subsequent display at the vehicle.

According to a seventh aspect of the present invention there is provided a method of operating a mobile parking policy enforcement apparatus. Initially, there is captured a geographical position of a vehicle in a pre-determined parking area and vehicle parking ticket information from the vehicle. Then, the geographical position and the vehicle parking ticket information are forwarded to a parking service management apparatus for subsequent verification thereof.

According to an eighth aspect of the present invention there is provided a method of operating a parking service management apparatus. Initially, there is executed the storing and managing pre-determined parking areas and service information for vehicle parking. Then, the service information is disseminated for vehicle parking to a pre-determined parking area. Hereafter, there is received a ticket request from a vehicle or an on-site parking meter apparatus, wherein the ticket request at least indicates a geographical position of a vehicle requesting the ticket. Finally, there is issued a vehicle parking ticket in accordance with the geographical position and service information for vehicle parking.

BRIEF DESCRIPTION OF THE DRAWINGS

In the following the present invention will be explained in more detail with reference to the drawing in which.

DETAILED DESCRIPTION

In the following the present invention will be explained in more detail through reference to the enclosed drawing. Here it should be noted that insofar as functionality being related to the present invention is explained this functionality may be implemented in hardware, software or any appropriate combination thereof.

Figure 1A:
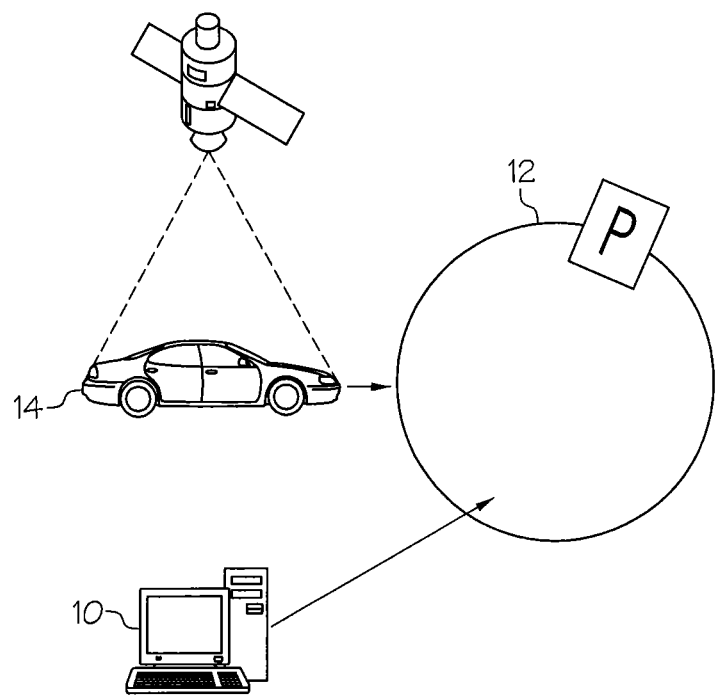
FIG. 1A and FIG. 1B show a basic concept underlying the set-up and delivery of virtual parking services according to the present invention.
Figure 1B:
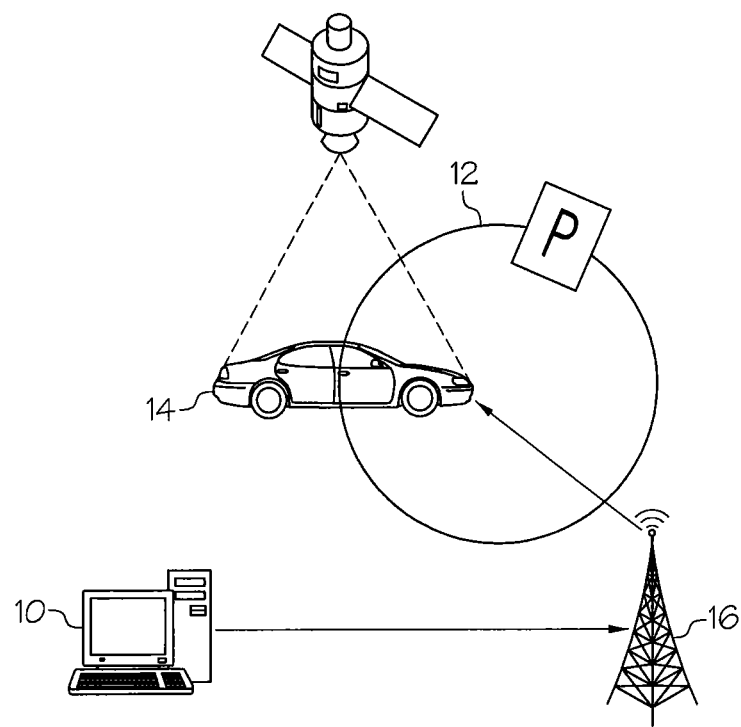

FIG. 1A and/or FIG. 1B show a basic concept underlying the set-up and delivery of virtual parking services according to the present invention.

As shown in FIG. 1A, according to the present invention a parking service management apparatus 10 defines a parking area 12 also referred to as pre-determined parking area in the following. The set-up of such a parking area 12 is a pre-requisite to delivery of parking services to a vehicle 14.

Further, according to the present invention the vehicle 14 should be provided with at least one positioning system, e.g., a satellite-based positioning system, for provision of a geographical position of the vehicle 14 to the parking service management apparatus 10 upon parking service delivery.

However, satellite-based systems are only one example for determining position according to the present invention and any other type of position methodology may be suitably applied in the framework of the present invention, e.g., triangulation or positioning on the basis of cell IDS in mobile communication systems.

As shown in FIG. 1B, when the vehicle 14 is entering the predetermined parking area 12 it will receive service information from the parking service management apparatus 10, e.g., location of parking houses, pricing profiles, type of parking restrictions, etc.

Further, when the driver of the vehicle 14 is interested in parking his vehicle in the pre-determined parking area 12 he will initiate communication, e.g., via a mobile communication system 16, with the parking service management apparatus 10 to forward at least his geographical position to the parking service management apparatus 10.

Then, according to the present invention the parking service management apparatus 10 will issue a virtual parking ticket for the vehicle 14 in line with the received geographical position and the current applicable service information. The parking service management apparatus 10 will then forward the virtual parking ticket to the vehicle.

Therefore, according to the present invention equipment for delivery of parking services requires significantly lower investment and maintenance costs compared to legacy systems. The reasons for this is that service functionality is concentrated in a centralized back-up. Also, the present invention leads to lower maintenance costs as no vending machines are needed to issue parking tickets and therefore these machines may also not be damaged.

Further, according to the present invention parking tickets are delivered as virtual parking tickets that need not be printed as long as they are displayed at the vehicle, e.g., through a display or any other suitable onboard unit in the vehicle 14. When mobile devices or telephones are used as onboard units in the vehicle 14 this leads to a very high convenience factor as cashless systems may be implemented through payment via mobile invoice. As alternative implementation of such cashless systems may rely on the sue of prepaid cards.

Further, the present invention allows for a full multi-dimensional and unprecedented flexibility in the tariff structure. Further important advantages are spatial flexibility, flexibility over time, parking service policy flexibility, e.g., progressive, linear, or regressive pricing, e.g., change of parking service price with parking duration.

Still further, the present invention allows for a steering of the parking traffic to certain parking spaces through dynamic parking fee adaption. Also, a combination with residential parking lies within the gist of the present invention. The present invention can be used seamlessly even for rental cars, taxis or any other type of vehicle.

Figure 2:
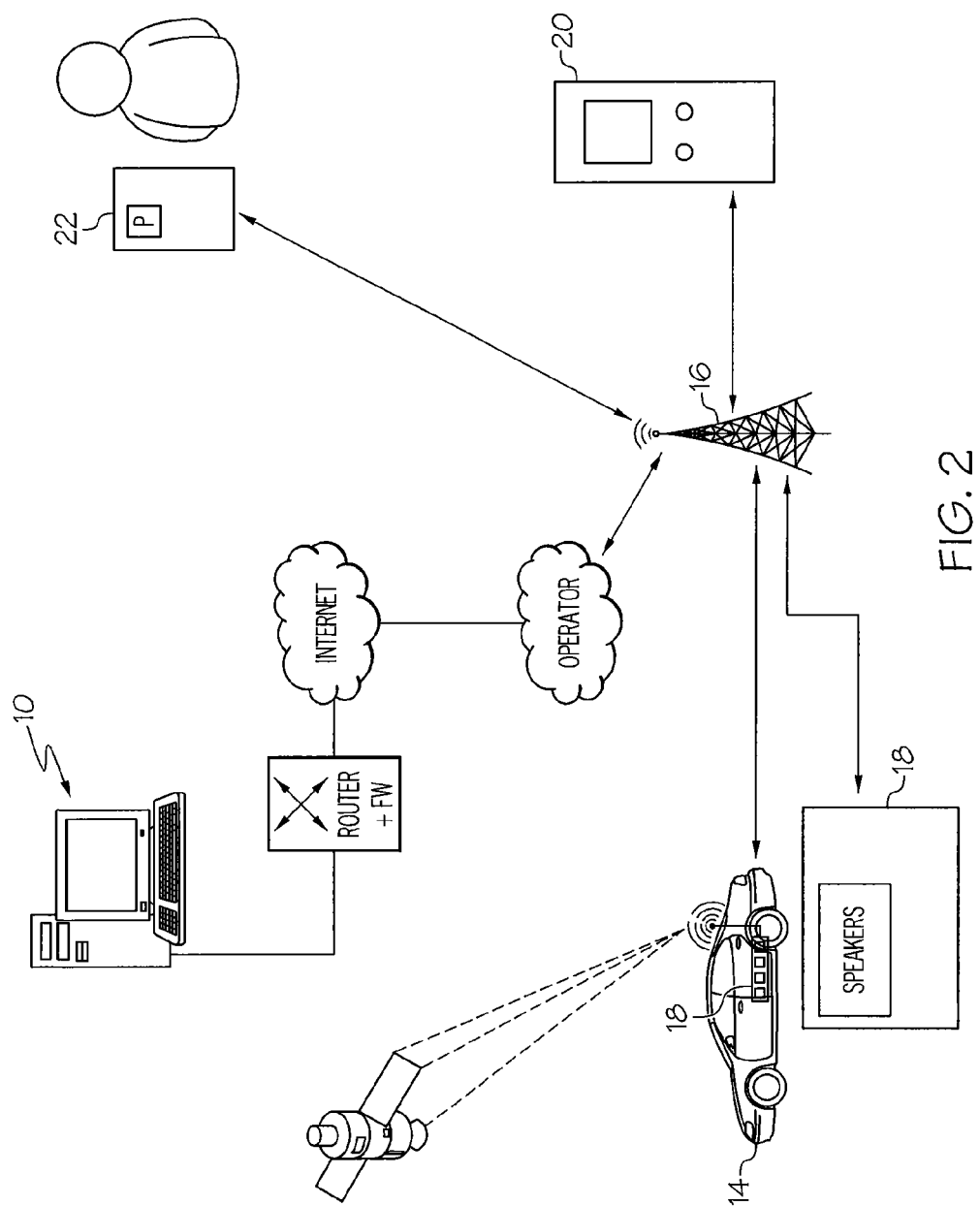
FIG. 2 shows a more detailed concept underlying the set-up and delivery of virtual parking services according to the present invention as shown in FIG. 1A and/or FIG. 1B.

FIG. 2 shows a more detailed concept underlying the set-up and delivery of virtual parking services according to the present invention as shown in FIG. 1A and/or FIG. 1B.

As already outlined with respect to FIG. 1A and/or FIG. 1B, the present invention relies on a combined application of geographical position and parking service-related information, in particular the forwarding of the parking service-related information from the parking service backend to the vehicle 14 and the real time communication of the geographical position of the vehicle 14 to the parking service backend. This allows management of parking spaces, parking zone and pricing profiles and to issue corresponding virtual parking tickets as a main service.

As shown in FIG. 2, according to the present invention, the driver's convenience it is possible, while sitting in the vehicle 14, to order the virtual parking ticket for use of a parking space and to then pay cashless via the cellular subscription or other eCash solutions. Thus, the present invention supports in-vehicle approval of parking-related services while driving around to implement least cost parking solutions and integration with multimodal navigation systems.

As shown in FIG. 2, one aspect of the present invention with respect to a driver of the vehicle 14 is related to a virtual parking meter apparatus 18, e.g., implemented as an applied of an onboard unit or a mobile device, e.g., a smartphone.

As shown in FIG. 2, the virtual parking meter apparatus 18 is connected to the parking service management apparatus 10 via the mobile communication system 16 and optionally also via the Internet. Therefore the driver may see continuously the currently applicable parking fees.

Further, if the driver wants to park, he may press a button so that his current geographical position, e.g., his GPS position, is automatically sent to the parking service management apparatus 10 which triggers the charging according to the received geographical position. Also, supplementary information is possibly preconfigured, e.g., the license plate number, may be sent along with geographical position to achieve a better mapping between virtual parking tickets and vehicles.

As shown in FIG. 2, for a transition period and for vehicles without the virtual parking meter apparatus 18 there may be provided a so-called virtual on-site parking meter apparatus 20.

The virtual on-site parking meter apparatus 20 is equipped with a virtual parking meter application which receives geographical position data from the vehicle 14 and parking service-related information from the parking service management apparatus 10.

Then, the on-site parking meter apparatus 20 will print a real parking ticket as substitution for the virtual parking ticket which printed parking ticket may be displayed at the vehicle 14, e.g., displayed visibly at the dashboard of the vehicle.

As shown in FIG. 2, a further aspect of the present invention relates to the enforcement of parking policies.

As shown in FIG. 2, for the enforcement of parking policies according to the present invention there is provided a mobile parking policy enforcement apparatus 22 running a parking enforcement application and being used by a traffic warden.

Further, the traffic warden initiates a verification of a parking ticket, either a virtual parking or a parking ticket printed by the on-site parking meter apparatus 20, by activating the application running in the mobile parking policy enforcement apparatus 22, e.g., by pushing a button or touching a touch screen.

Further, the verification is initiated at the parking service management apparatus 10 to investigate whether a valid parking ticket exists for the vehicle 14 and its geographical position. Supplementary information possibly scanned from, e.g., a tag or a license plate, may be send to the parking service management apparatus 10 along with the geographical position for a better mapping of a virtual parking ticket to a specific vehicle.

Further, in case a parking ticket is displayed at a dashboard it is scanned and then forwarded to the parking service management apparatus 10 for verification.

Still further, in case a vehicle has no valid parking ticket the usual process for parking violations will be initiated by the traffic warden.

As may be understood from a description of FIG. 2 the present invention offers even further advantages as discussed above with respect to FIG. 1A and/or FIG. 1B.

The present invention allows for in-vehicle assigning of parking fees and least cost least-cost delivery of parking services. It provides an opportunity to integrate multimodal navigational systems and car finder functions may be included for free.

Further, present invention allows for a mobile parking time expiry warning, a remote parking time extension, and municipal warning messages to drivers of parked vehicles.

Further, the present invention provides a migration option from legacy parking system to the virtual parking system according to the present invention through provision of the on-site parking meter apparatus 20.

Still further, the present invention enable effective car-park free space routing systems.

Figure 3:
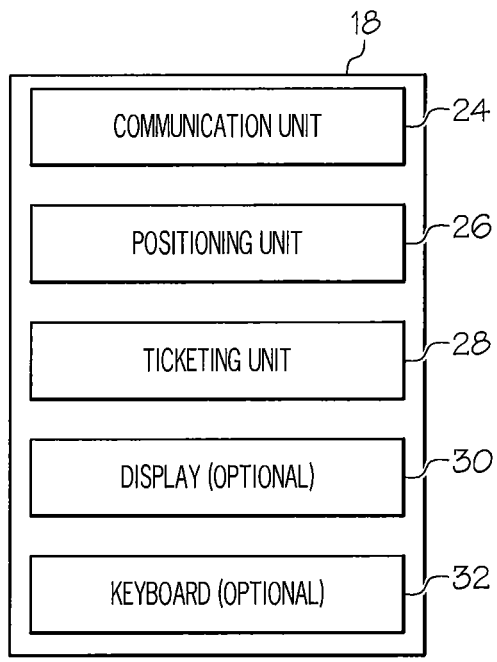
FIG. 3 shows a schematic diagram of a virtual parking meter apparatus according to the present invention.

FIG. 3 shows a schematic diagram of a virtual parking meter apparatus 18 according to the present invention.

As shown in FIG. 3, virtual parking meter apparatus 18 according to the present invention comprises a communication unit 24, a positioning unit 26, and a ticketing unit 28. Optionally, the virtual parking meter apparatus 18 may also comprise a display 30 and/or a keyboard 32.

Figure 4:
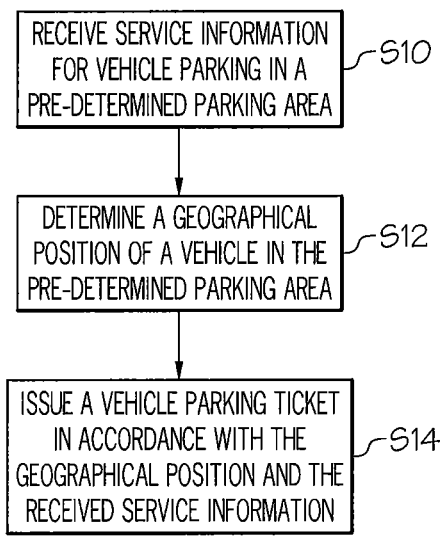
FIG. 4 shows a flowchart of operation of the virtual parking meter apparatus shown in FIG. 3.

FIG. 4 shows a flowchart of operation of the virtual parking meter apparatus shown in FIG. 3.

As shown in FIG. 4, in a step S10 operatively executed by the communication unit 24, the virtual parking meter apparatus 18 receives service information for vehicle parking in a pre-determined parking area from a parking management server.

As shown in FIG. 4, in a step S12 operatively executed by the positioning unit 26, there is determined a geographical position of a vehicle in the pre-determined parking area.

As shown in FIG. 4, in a step S14 operatively executed by the ticketing unit 28, there is requested an issuance of a vehicle parking ticket at the parking service management apparatus 10 in accordance with the geographical position and the received service information.

Further, it should be noted that virtual parking meter apparatus 18 may be an onboard device or a mobile telephone device. Also, it may comprise a display, speaker, a keyboard and/or a touchscreen for user interaction. E.g., the display and/or speaker may inform drivers of the vehicle about incoming parking fee information. Also, the keyboard or touchscreen may be provided for information input by the driver, e.g., approval of parking fees.

Further, it should be noted that the communication unit 28 may be adapted to mobile wireless communication, e.g., according to GSM, GPRS, Edge, UMTS, HSPA, LET etc.

Still further, it should be noted that the positioning module 26 may be operated according to any type of positioning method, e.g., GPS, Galileo, positioning by cell ID in a cellular communication network, triangulation, etc.

Figure 5:
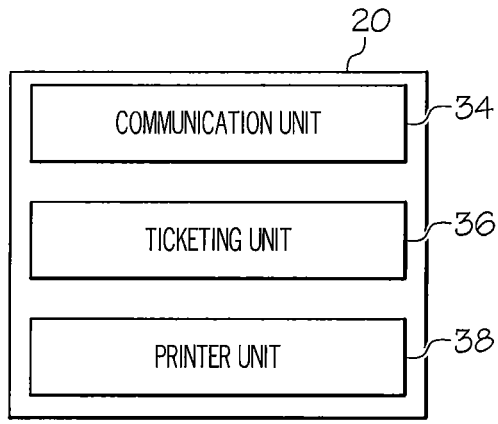
FIG. 5 shows a schematic diagram a virtual on-site parking meter apparatus according to the present invention.

FIG. 5 shows a schematic diagram a virtual on-site parking meter apparatus 20 according to the present invention.

As shown in FIG. 5, the virtual on-site parking meter apparatus 20 according to the present invention comprises a communication unit 34, a ticketing unit 36, and a printer unit 38.

Figure 6:
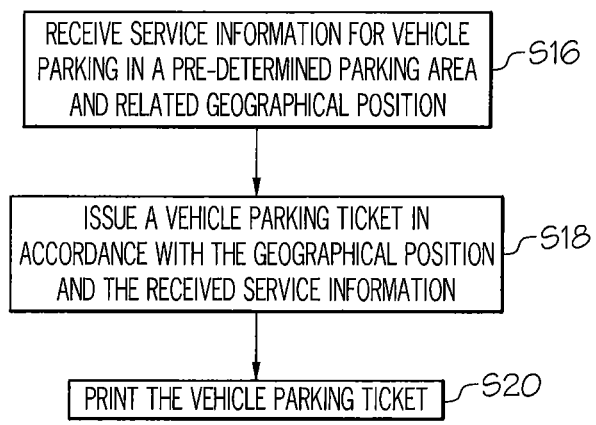
FIG. 6 shows a flowchart of operation of the virtual on-site parking meter apparatus shown in FIG. 5.

FIG. 6 shows a flowchart of operation of the virtual on-site parking meter apparatus shown in FIG. 5.

As shown in FIG. 6, in a step S16 operatively executed by the communication unit 34, virtual on-site parking meter apparatus 20 receives service information for vehicle parking in a pre-determined parking area from a parking service management apparatus 10 and further a geographical position of the vehicle 14 in the pre-determined geographical area 12.

It should be noted that the communication unit 34 may be adapted to mobile wireless communication, e.g., according to GSM, GPRS, Edge, UMTS, HSPA, LET etc.

As shown in FIG. 6, in a step S18 operatively executed by the ticketing unit 36, there is triggered an issuance of a vehicle parking ticket at the parking service management apparatus 10 in accordance with the geographical position and the received service information.

As shown in FIG. 6, in a step S20 operatively executed by the printing unit 38, the vehicle parking ticket is printed for subsequent display at the vehicle 14.

Figure 7:
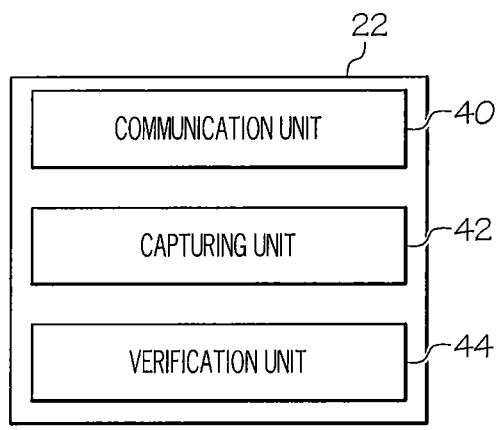
FIG. 7 shows a schematic diagram a mobile parking policy enforcement apparatus according to the present invention.

FIG. 7 shows a schematic diagram a mobile parking policy enforcement apparatus 22 according to the present invention.

As shown in FIG. 7, mobile parking policy enforcement apparatus 22 according to the present invention comprises a communication unit 40, a capturing unit 42, and a verification unit 44.

Figure 8:
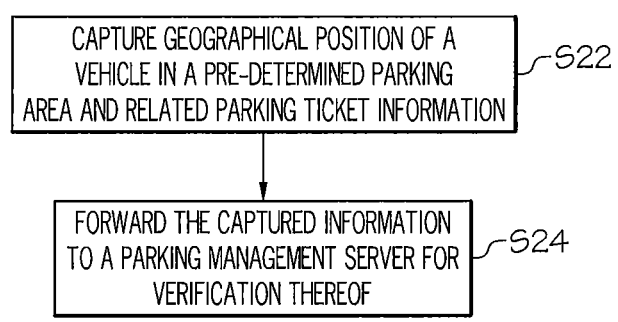
FIG. 8 shows a flowchart of operation of the mobile parking policy enforcement apparatus shown in FIG. 7.

FIG. 8 shows a flowchart of operation of the mobile parking policy enforcement apparatus shown in FIG. 7.

As shown in FIG. 8, in a step S22 operatively executed by the capturing unit 42, the mobile parking policy enforcement apparatus 22 captures a geographical position of the vehicle 14 in the pre-determined parking area 12 and further vehicle parking ticket information from the vehicle 14.

As shown in FIG. 8, in a step S24 operatively executed by the verification unit 44, the geographical position and the vehicle parking ticket information are forwarded to the parking service management apparatus 10 for subsequent verification thereof.

It should be noted that the capturing unit 42 comprises sensors adapted to scan vehicle parking ticket information, e.g., to scan a license plate, bar codes, QR codes or any other type of tags.

Further, the communication unit 40 may be adapted to mobile wireless communication, e.g., according to GSM, GPRS, Edge, UMTS, HSPA, LET etc.

Figure 9:
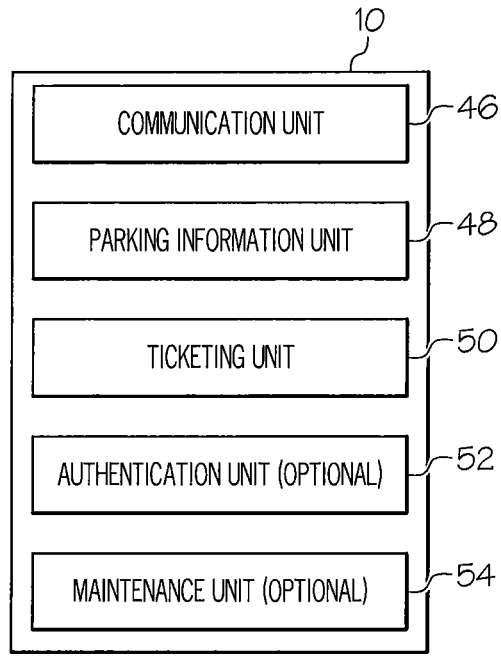
FIG. 9 shows a schematic diagram a parking service management apparatus according to the present invention.

FIG. 9 shows a schematic diagram a parking service management apparatus 10 according to the present invention.

As shown in FIG. 9, the parking service management apparatus 10 according to the present invention comprises a communication unit 46, a parking information unit 48, a ticketing unit 50, optionally an authentication unit 52, and further optionally a maintenance unit.

Figure 10:
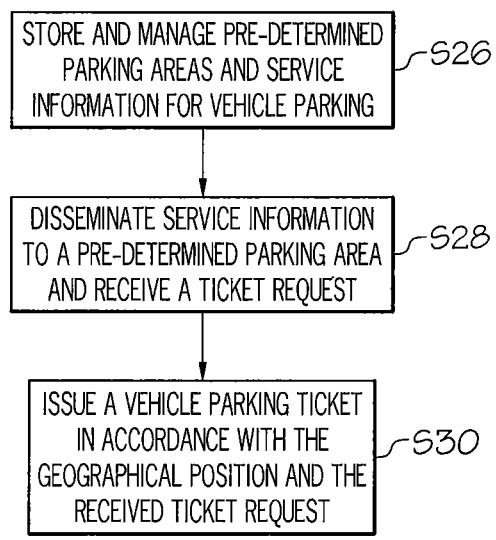
FIG. 10 shows a flowchart of operation of parking service management apparatus shown in FIG. 9.

FIG. 10 shows a flowchart of operation of the parking service management apparatus 10 shown in FIG. 9.

As shown in FIG. 10, in a step S26 operatively executed by the parking information unit 48, pre-determined parking areas and service information for vehicle parking are stored in a memory or database and also managed during operation of the parking service management apparatus 10. Here it should be noted that the parking information unit 48 may be realized as geographical information system GIS.

As shown in FIG. 10, in a step S28 operatively executed by the communication unit 46, the service information for vehicle parking is disseminated to a pre-determined parking area. This may be achieved by interfacing the parking service management apparatus 10 with a messaging system that supports broadcasting of service related information in an area-specific manner.

As shown in FIG. 10, in the Step S28 operatively executed by the communication unit 46, there is also received a ticket request from the vehicle 14 or the on-site parking meter apparatus 20. According to the present invention the ticket request at least indicates a geographical position of the vehicle 14 requesting the ticket.

As shown in FIG. 10, in the step 30 operatively executed by the ticketing unit 50, there is issued of a vehicle parking ticket in accordance with the geographical position and service information for vehicle parking.

Further, operatively the authentication unit 52 is adapted to authenticate a user of parking services or a user of enforcement functions. This aspect of the present invention supports billing based on mobile subscriber identities. When the authentication unit 52 also implements an authorization function this further allows for implementing enforcement functions into the system.

Still further, operatively the maintenance unit 54 is adapted to maintain pre-determined parking areas and service information for vehicle parking stored by the parking information unit. Here, the maintenance unit may comprise a graphical user interface GUI for maintaining parking zones, pricing policies, and/or authorization data.

In the following, different application examples of the present invention will be explained with respect to FIGS. 11 to 14.

Figure 11:
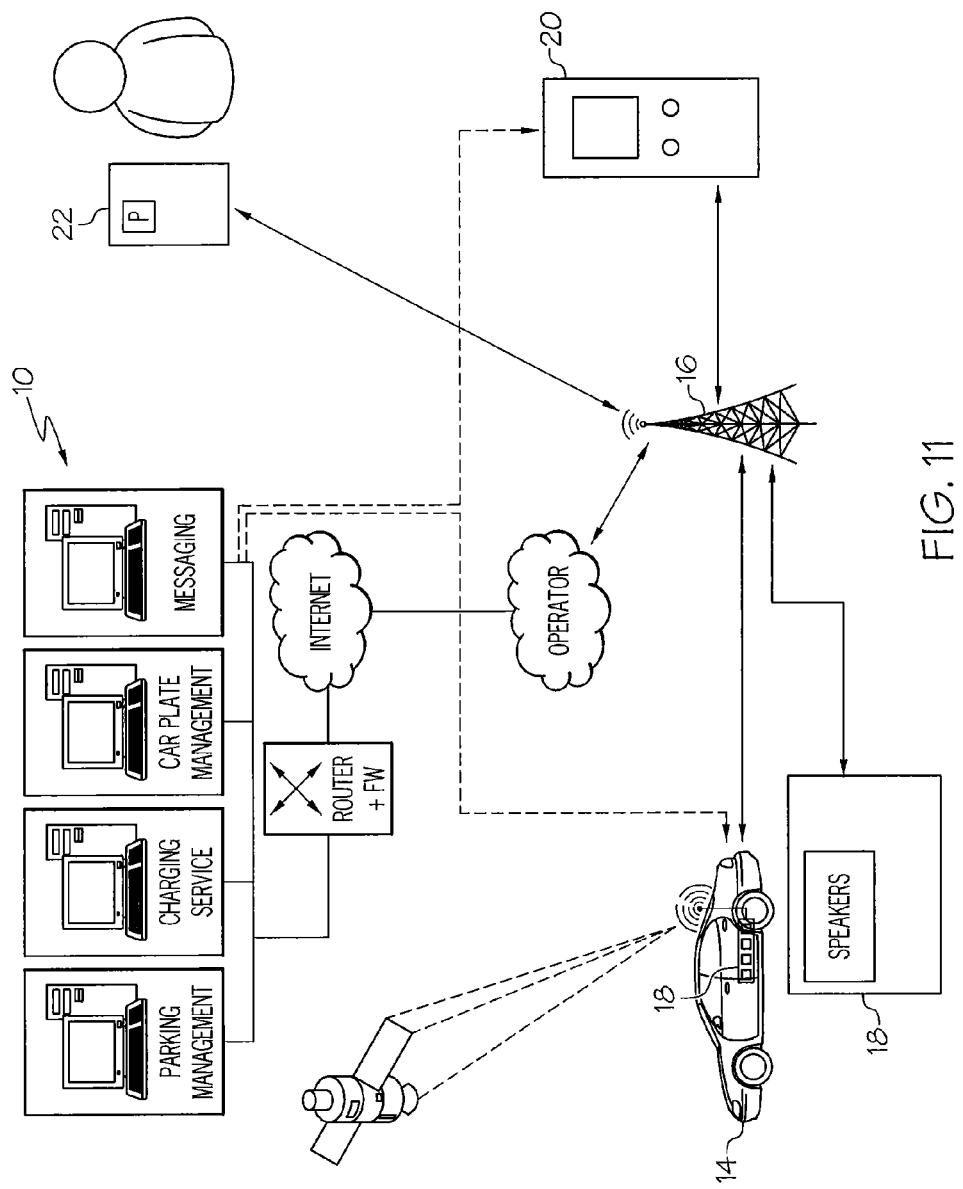
FIG. 11 shows the exchange of parking related information according to a first application example of the present invention.

FIG. 11 shows the exchange of parking related information according to a first application example of the present invention being related to the distribution of the parking related service information.

As shown in FIG. 11, generally the parking service management apparatus 10 may be implemented in the form of a service management server. Also, without limiting the scope of the present invention the functionality of the service management server may be assigned to different sub-units for parking management, charging of parking services, car plate management, and messaging of perking information.

As shown in FIG. 11, the parking management related part of the parking management server needs not by itself implement the functionality the broadcasting of the parking related service information as it is sufficient to provide an interface to an appropriate messaging system.

Further, it should be noted that within the framework of parking services according to the present invention, the owner of the parking space, e.g., a municipality, may change the tariff structure and assignment of tariff zone, e.g., by sending a changed tariff structure to the parking management server.

Further, another option would be that the municipality runs the parking management himself and uses an appropriate interface, e.g., a parking management center and related user interfaces for the maintenance of parking service data.

E.g., on a display different colors could represent different parking zones and related service fees and parking costs could be varied with respect to distance to town center or any other point of interest as well as different times of day.

In conclusion, through provision of the parking management server the municipal authorities or companies running a parking system are able to implement very flexible spatial and time varying parking zones and related parking charges as well as tariff policies varying individually per zone or as a common profile applicable to a plurality of zones.

As shown in FIG. 11, the parking service management server may constantly send out tariff information in relation to different parking zones to the virtual parking meter apparatus 18. This allows to constantly search for a least cost parking opportunity.

Figure 12:
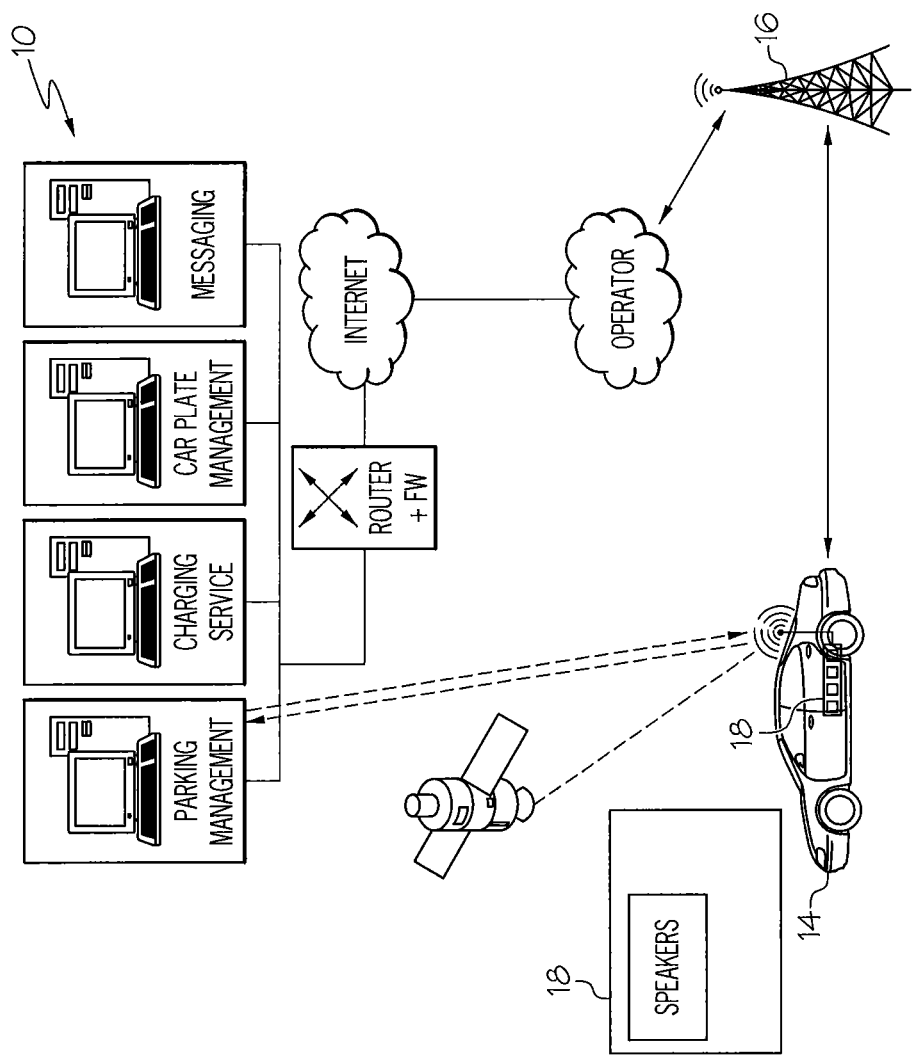
FIG. 12 shows the exchange of parking related information according to a second application example of the present invention.

FIG. 12 shows the exchange of parking related information according to a second application example of the present invention being related to the delivery of parking services and generation of related tickets.

As shown in FIG. 12, when a driver wants to use a parking service he sends a request for parking information to the management backend. Here, the parking request contains information about the geographical position of the user, e.g., GPS data. Further, the request may also comprise the time of the day.

Then the parking management server looks up the tariff structure from, e.g., a database and sends it back to the driver. Optionally, and as explained with respect to FIG. 11, parking information may be received continually while roaming in the parking area. It should be noted that the reply may also contain a maximum allowable parking time.

Further, when the driver wants to start parking he confirms the start of parking and sends a start parking message describing the number of hours he wants to park or the start time when the tariff structure allows parking per minute. The starting message may also comprise the license plate number of the vehicle for better mapping of location of the vehicle and identification information needed for billing, e.g., according to MSISDN or IMEI.

As shown in FIG. 12, in response to the request the parking management server generates a virtual parking ticket.

It should be noted that according to the present invention a parking ticket may be created by incorporating a hash key into the virtual parking ticket. This provides a reference when the driver wants to stop parking or applies for a remote extension of an existing parking ticket. For the virtual on-site parking meter apparatus 20 the parking ticket is available to print for subsequent scanning through the traffic warden.

As shown in FIG. 12, the parking management server will store the generated information in a database, start the billing process, and forward a confirmation to the driver in the form of a virtual parking ticket.

Further, depending on the applicable tariff structure there are different possibilities to end a parking process. Independent of which option is applied an end of a parking process will trigger a final billing process.

A first option to stop a parking process is when the time allotted for parking times out. Here, after lapse of the requested parking time the virtual parking ticket expires.

A second option to stop a parking process is to stop the parking process prematurely. Here, the driver has to request the end of parking by sending a request to stop the parking, e.g., by pushing a button at the virtual parking meter apparatus.

Further, when parking per minute is allowed the driver sends the request to stop parking to the parking management server when he wants to stop parking. Optionally, tariffs may also allow prematurely stopping prior to expiry of a fixed parking duration if the driver returns earlier than anticipated.

Still further, it should be noted that the issuance of a request to stop a parking process may be generated automatically when the virtual parking meter apparatus recognizes that the car is moving again. This implies a continuous monitoring of the geographical position of the vehicle as indicated by the positioning unit 24 of the virtual parking meter unit 18. Also, the request to stop the parking process may contain supplementary information like final geographical position, time, and/or hash key in support of the final billing process.

A third option to deal with the expiry of approved parking time or of maximum parking time is the extension of parking time. Here, the driver is informed by the parking management server through notification of a parking time over message that the granted parking time has expired and may use an option to extend the parking time, e.g., by using the virtual parking meter apparatus to submit a request for extension to the parking management server. Such a request for extension may comprise additional parking time, name of driver, license plate number, identification information, e.g., IMEI, and/or the applicable hash key. Then the parking management server may confirm the request and the driver may acknowledge such confirmation.

Figure 13:
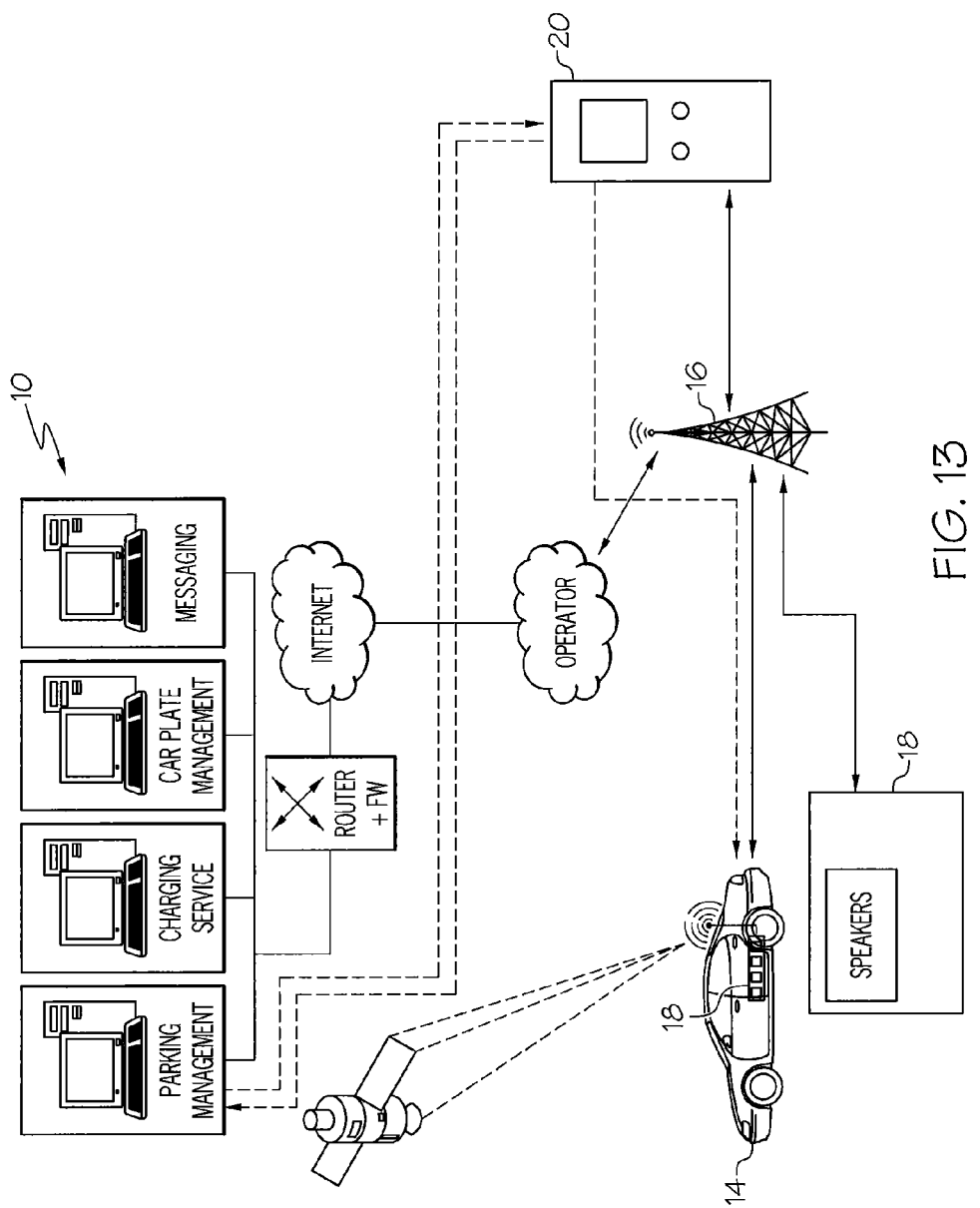
FIG. 13 shows the exchange of parking related information according to a third application example of the present invention.

FIG. 13 shows the exchange of parking-related information according to a third application example of the present invention being related to the operation of the virtual on-site parking meter apparatus.

As shown in FIG. 13, the main difference between the application of the virtual parking meter apparatus 18 and the virtual on-site parking meter apparatus 20 is that here the on-site parking meter apparatus 20 interrogates the parking management server for provision of parking service related information as explained above with respect to FIG. 12.

As shown in FIG. 13, after printing of the virtual parking ticket optionally with the hash key, the driver will put the virtual parking ticket in a visible way in the vehicle 14. The use of a hash key is beneficial for the subsequent verification of the virtual parking ticket by a traffic warden.

Figure 14:
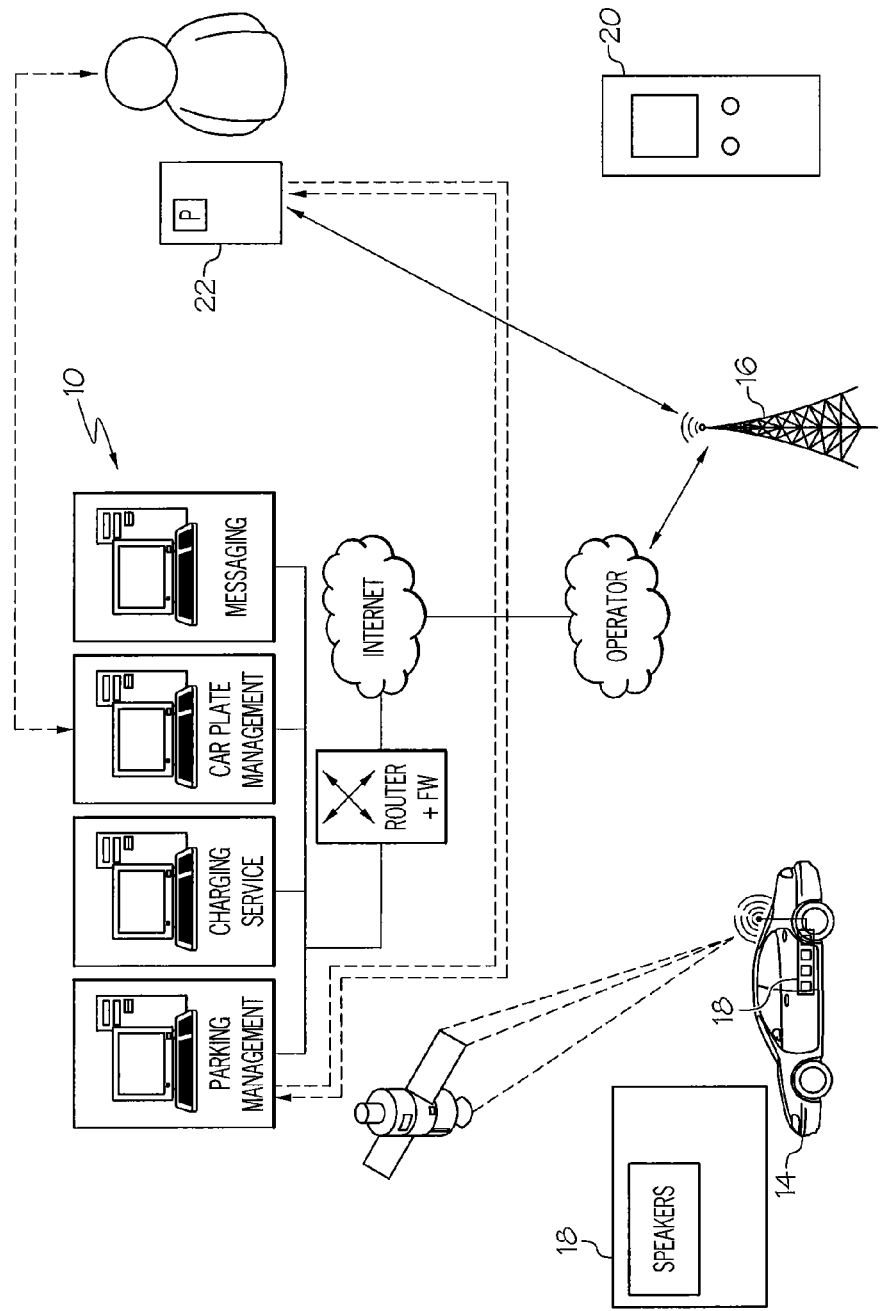
FIG. 14 shows the exchange of parking related information according to a fourth application example of the present invention.

FIG. 14 shows the exchange of parking-related information according to a fourth application example of the present invention being related to the verification of a virtual parking ticket by a traffic warden.

As shown in FIG. 14, when a traffic warden wants to check whether a parking service user is paying for the parking space and parking service he will send the geographical position of the vehicle. Additionally, the license plate number of the vehicle may be sent along with the geographical position for a better mapping of the geographical position to the vehicle at the side of the parking management server. Further, in case of a printed parking ticket also the printed hash key should be included into the verification request.

As shown in FIG. 14, the traffic warden will receive a reply from the parking management server whether the driver has paid for the parking services or not. Such reply may indicate that the payment of the driver is correct. Otherwise, the reply may include information indicating the severity of parking violation such as time when the parking period expired and length of overdue period.

As shown in FIG. 14, upon violation of parking regulations the traffic warden may send a message to the parking management server so that the back end may handle an automatic sending of a parking violation ticket to the owner of the vehicle. In addition to that such a parking violation ticket may also be printed out locally through the traffic warden for subsequent attachment to the vehicle.

It should be noted that when the traffic warden needs to raise a parking violation fine and has to issue a parking violation ticket, the inclusion of the vehicle license plate number is mandatory.

The invention claimed is:

1. A virtual parking meter apparatus, comprising:
 a communication unit adapted to receive service information for vehicle parking in a spatial and time varying parking area from a parking service management apparatus;
 a positioning unit adapted to determine a geographical position of a vehicle in the spatial and time varying parking area; and
 a ticketing unit adapted to send a ticket request to request issuance of a vehicle parking ticket at the parking service management apparatus in accordance with the geographical position, the received service information, and a user of the virtual parking meter apparatus being authenticated as a valid user of parking services in the spatial and time varying parking area by a parking service management apparatus receiving the ticket request from the virtual parking meter apparatus and authenticating the user responsive thereto.

2. The virtual parking meter apparatus according to claim 1, wherein the ticketing unit and the positioning unit are integrated within the vehicle or are integrated within a mobile telephone device.

3. The virtual parking meter apparatus according to claim 1, further comprising a display, speaker, and/or keyboard for user interaction.

4. The virtual parking meter apparatus according to claim 1, wherein the communication unit is configured for mobile wireless communication.

5. The virtual parking meter apparatus according to claim 1, wherein the positioning unit comprises a Global Positioning System (GPS) positioning device.

6. The virtual parking meter apparatus according to claim 1, wherein the vehicle parking ticket comprises a tariff that is adjusted based on the spatial and time varying parking area.

7. The virtual parking meter apparatus according to claim 1, wherein the ticketing unit is further adapted to adjust a tariff associated with the spatial and time varying parking area.

8. A parking service management apparatus, comprising:
 a parking information unit adapted to store and manage spatial and time varying parking areas and service information for vehicle parking;
 a communication unit adapted to:
  disseminate the service information for vehicle parking to a spatial and time varying parking area, and
  receive a ticket request from a vehicle or an on-site parking meter apparatus, wherein the ticket request at least indicates a geographical position of a vehicle requesting the ticket; and
 an authentication unit adapted for authentication of a user of parking services responsive to the ticket request that was received; and
 a ticketing unit adapted to issue a vehicle parking ticket in accordance with the geographical position and service information for vehicle parking, and responsive to the authentication of the user.

9. The parking service management apparatus in accordance with claim 8, further comprising a maintenance unit adapted to maintain spatial and time varying parking areas and service information for vehicle parking stored by the parking information unit.

10. A method of operating a virtual parking meter apparatus, comprising the steps of:
 receiving service information for vehicle parking in a spatial and time varying parking area from a parking service management apparatus;
 determining a geographical position of a vehicle in the spatial and time varying parking area; and
 sending a ticket request to request issuance of a vehicle parking ticket at the parking service management apparatus in accordance with the geographical position, the received service information, and a user of the virtual parking meter apparatus being authenticated as a valid user of parking services in the spatial and time varying parking area by a parking service management apparatus that receives the ticket request from the virtual parking meter apparatus and authenticating the user responsive thereto.

11. The method of claim 10, wherein the receiving service information and the determining the geographical position of the vehicle are carried out by a device in the vehicle.

12. The method of claim 10, wherein the receiving service information and the determining the geographical position of the vehicle are carried out by a mobile telephone device.

13. The method of claim 10, wherein the receiving service information comprises receiving the service information through a wireless communication network.

14. The method of claim 10, wherein the determining the geographical position of the vehicle is carried out at least in part by a Global Positioning System (GPS) positioning device.

15. A method of operating a parking service management apparatus, comprising the steps of:
- storing and managing spatial and time varying parking areas and service information for vehicle parking;
- disseminating the service information for vehicle parking to a spatial and time varying parking area;
- receiving a ticket request from a vehicle or an on-site parking meter apparatus, wherein the ticket request at least indicates a geographical position of the vehicle requesting the ticket;
- authenticating a user of parking services responsive to the receiving the ticket request; and
- issuing a vehicle parking ticket responsive to the authenticating the user and in accordance with the geographical position and service information for vehicle parking.

16. The method of claim 15, wherein the receiving the ticket request and the issuing the vehicle parking ticket are carried out by the parking service management apparatus.

17. The method of claim 15, wherein the disseminating the service information comprises communicating the service information through a wireless communication network.

18. The method of claim 15, further comprising determining the geographical position of the vehicle requesting the ticket using Global Positioning System (GPS) positioning device.

19. The method of claim 15, further comprising repetitively updating the spatial and time varying parking areas and service information for vehicle parking responsive to each receipt of a ticket request.

\* \* \* \* \*

UNITED STATES PATENT AND TRADEMARK OFFICE
CERTIFICATE OF CORRECTION

PATENT NO. : 9,576,486 B2
APPLICATION NO. : 14/427264
DATED : February 21, 2017
INVENTOR(S) : Engelbert et al.

Page 1 of 2

It is certified that error appears in the above-identified patent and that said Letters Patent is hereby corrected as shown below:

In the Specification

In Column 2, Line 2, delete "needed to" and insert -- needed or --, therefor.

In Column 2, Line 3, delete "and receive" and insert -- and to receive --, therefor.

In Column 4, Line 1, delete "diagram a" and insert -- diagram of a --, therefor.

In Column 4, Line 5, delete "diagram a" and insert -- diagram of a --, therefor.

In Column 4, Line 10, delete "diagram a" and insert -- diagram of a --, therefor.

In Column 5, Line 8, delete "reasons" and insert -- reason --, therefor.

In Column 5, Line 20, delete "As" and insert -- An --, therefor.

In Column 5, Line 21, delete "sue" and insert -- use --, therefor.

In Column 5, Line 31, delete "adaption." and insert -- adaptation. --, therefor.

In Column 5, Line 47, delete "tickets" and insert -- ticket --, therefor.

In Column 5, Line 49, delete "the driver's" and insert -- for driver's --, therefor.

In Column 5, Line 54, delete "around to" and insert -- around and to --, therefor.

In Column 5, Line 59, delete "applied" and insert -- application --, therefor.

In Column 6, Line 4, delete "information is" and insert -- information which is --, therefor.

Signed and Sealed this
Seventh Day of April, 2020

Andrei Iancu
*Director of the United States Patent and Trademark Office*

CERTIFICATE OF CORRECTION (continued)
U.S. Pat. No. 9,576,486 B2

In Column 6, Line 5, delete "with geographical" and insert -- with the geographical --, therefor.

In Column 6, Line 30, delete "parking or" and insert -- parking ticket or --, therefor.

In Column 7, Line 30, delete "communication unit 28" and insert -- communication unit 24 --, therefor.

In Column 7, Line 38, delete "diagram a" and insert -- diagram of a --, therefor.

In Column 7, Line 65, delete "diagram a" and insert -- diagram of a --, therefor.

In Column 8, Line 24, delete "diagram a" and insert -- diagram of a --, therefor.

In Column 8, Line 48, delete "Step" and insert -- step --, therefor.

In Column 8, Line 54, delete "step 30" and insert -- step S30 --, therefor.

In Column 8, Line 55, delete "issued of a" and insert -- issued a --, therefor.

In Column 9, Line 38, delete "of day." and insert -- of a day. --, therefor.

In Column 10, Line 4, delete "for" and insert -- for a --, therefor.

In Column 10, Line 44, delete "positioning unit 24" and insert -- positioning unit 26 --, therefor.

In Column 10, Line 57, delete "comprise" and insert -- comprises --, therefor.

In Column 11, Line 40, delete "vehicle" and insert -- vehicle's --, therefor.